US008766472B2

(12) United States Patent
Kim

(10) Patent No.: US 8,766,472 B2
(45) Date of Patent: Jul. 1, 2014

(54) APPARATUS FOR SHUTTING OFF POWER SUPPLY FOR VEHICLE

(75) Inventor: Dong Soo Kim, Jinhae-si (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 834 days.

(21) Appl. No.: 12/908,084

(22) Filed: Oct. 20, 2010

(65) Prior Publication Data

US 2011/0109156 A1 May 12, 2011

(30) Foreign Application Priority Data

Nov. 11, 2009 (KR) ............................ 10-2009-108368
Nov. 11, 2009 (KR) ............................ 10-2009-108369

(51) Int. Cl.
*B60L 1/00* (2006.01)
*B60L 3/00* (2006.01)
*H02G 3/00* (2006.01)

(52) U.S. Cl.
USPC ........................................ 307/9.1; 307/10.1

(58) Field of Classification Search
None
See application file for complete search history.

(56) References Cited

U.S. PATENT DOCUMENTS

2005/0082913 A1* 4/2005 Nomura ..................... 307/10.1
2006/0103234 A1* 5/2006 Jeong ............................ 303/89

* cited by examiner

*Primary Examiner* — Jared Fureman
*Assistant Examiner* — Aqeel Bukhari
(74) *Attorney, Agent, or Firm* — Ladas & Parry LLP

(57) ABSTRACT

An apparatus for shutting off a power supply for construction equipment or a vehicle driven by an engine, including a power supply, functional electrical devices connected to the power supply, a key switch managing the power supply, and a main relay applying or shutting off the power supply to the functional electrical devices in accordance with the state of the key switch, which includes a manipulation sensing means, a control relay installed between the key switch and the main relay to apply a key switch signal to a driving unit of the main relay if the electricity is not applied to its driving unit and to shut off the key switch signal to the driving unit of the main relay if the electricity is applied to its driving unit, and a controller receiving a manipulation signal from the manipulation sensing means and shutting off the power by driving the control relay if there is no manipulation signal for a predetermined time. If the equipment is not used for a predetermined time, the engine is stopped even under the condition that the engine is being driven, and even if the key switch is in a turned-on state, the power that is supplied to the functional electrical devices can be stably intercepted by the controller.

11 Claims, 6 Drawing Sheets

APPARATUS FOR SHUTTING OFF POWER SUPPLY FOR VEHICLE

CROSS-REFERENCE TO RELATED APPLICATION

This application is based on and claims priority from Korean Patent Application No. 10-2009-108368 and 10-2009-108369, filed on Nov. 11, 2009, respectively in the Korean Intellectual Property Office, the disclosure of which is incorporated herein in its entirety by reference.

BACKGROUND OF THE INVENTION

1. Field of the Invention

The present invention relates to an apparatus for shutting off a power supply for a vehicle, and more particularly, the present invention relates to an apparatus for shutting off a power supply for a vehicle, which can stably shut off a power supply to functional electrical devices and reduce power consumption through the use of minimum power even if a key switch is in a turned-on state. Specifically, the present invention relates to an apparatus for shutting off a power supply for a vehicle, in which a controller grasps an operator's intention to manipulate equipment, and if there is no intention for an operator to manipulate the equipment for a predetermined time, the controller turns off an engine start regardless of the operation of the key switch, and shuts off the power supply to the functional electrical devices connected to a battery to prevent the discharge of the battery which may occur due to an engine stop. Also, the present invention relates to an apparatus for shutting off a power supply for a vehicle, which can prevent deterioration of the reliability in comparison to a power supply system by an electrical circuit in the related art even though the power is controlled by the controller on a normal operation condition.

2. Description of the Prior Art

According to an apparatus for shutting off a power supply for a vehicle in the related art, as illustrate in FIG. 1, if a key switch 101 is turned on, a controller (electronic control unit (ECU)) 104 operates, and at this time, the controller (ECU) 104 supplies power to a functional electrical device (not illustrated) by driving a main relay 102.

If an operator gets out of equipment in a state where the key switch 101 is in a turned-on state and an engine is operated, and a predetermined time elapses after the controller (ECU) 104 senses that there is no further manipulation of a control lever 103, the controller (ECU) 104 sends an engine stop signal to an engine ECU. When the engine ECU receives this signal, it stops fuel injection and then stops the engine.

If the engine is stopped, an alternator stops generation of the electricity. In this case, since the functional electrical devices connected to the main relay 102 are driven only by the battery, the battery may be discharged while the engine stop state is maintained for a long time.

In order to solve such battery discharge phenomenon, as illustrated in FIG. 2, the controller (ECU) 104 has been changed to have a structure that drives the main relay 102 by the key switch signal.

However, in order to prevent the battery discharge after the engine stop, it is required to continuously supply the power to the controller (ECU) 104 so that the controller (ECU) 104 turns off the main relay 102 to shut off the power supply.

Here, since the controller (ECU) 104 has relatively complicated components and control algorithms, it is sensitive to external environmental conditions, it is often difficult to completely cut off malfunction caused by the environmental change. Accordingly, due to the incomplete operation of the controller (ECU) 104, it is expected that the power supply to the main relay 102 may be unstable.

Also, in order to implement a backup means for making it possible to perform the basic operation of the equipment even though trouble occurs in the controller (ECU) 104, a separate circuit is required, and this cause the increase of the manufacturing cost and the complexity of the system.

On the other hand, according to the apparatus for shutting off a power supply for a vehicle in the related art, as illustrated in FIG. 1, if the key switch 101 is turned on, the controller (ECU) 103 operates and controls the main relay 102 to supply the power to the functional electrical devices.

If it is required to shut off the power supply even through the key switch 101 is in a turned-on state, the controller (ECU) 103 shuts off the power supply to the main relay 102 by cutting off the output connected to a driving unit of the main relay 102.

In this case, the controller (ECU) 103 continuously consumes the power, and in the case of a power system using a battery, the battery voltage becomes lowered to shorten the lifetime of the battery.

Also, the main relay 102 directly controls the controller (ECU) 103, and thus if the reliability of the controller (ECU) 103 is not high, the power may be not appropriately supplied to the devices.

As described above, according to the apparatus for shutting off the power supply for a vehicle in the related art, if it is intended to optionally shut off the power supply by the controller (ECU) 103 in turned-on state of the key switch 101, it is required for the controller (ECU) 103 to continuously apply the power, and in this case, the continuous use of the electricity is unavoidable. Also, if the controller (ECU) 103 is unstable even in a normally used state, the main relay 102 may be turned off to cause all the functional electrical devices to be unusable.

SUMMARY OF THE INVENTION

Accordingly, the present invention has been made to solve the above-mentioned problems occurring in the prior art while advantages achieved by the prior art are maintained intact.

The present invention proposes an apparatus for shutting off a power supply for a vehicle, in which a controller grasps an operator's intention to manipulate the equipment, and if there is no intention for an operator to manipulate the equipment for a predetermined time, the controller turns off an engine start regardless of the operation of a key switch, and shuts off the power supply to the functional electrical devices connected to a battery to prevent the discharge of the battery which may occur due to an engine stop.

Also, the present invention proposes an apparatus for shutting off a power supply for a vehicle, which can prevent deterioration of the reliability in comparison to a power supply system by an electrical circuit in the related art even though the power supply is controlled by the controller on a normal operation condition.

Also, the present invention proposes an apparatus for shutting off a power supply for a vehicle, which can stably shut off a power supply to functional electrical devices by the determination of the controller even in the turned-on state of the key switch and reduce power consumption through the use of minimum power even in the turned-on state of the key switch.

In one aspect of the present invention, there is provided an apparatus for shutting off a power supply for construction equipment or a vehicle driven by an engine, including a power supply, functional electrical devices connected to the power supply, a key switch managing the power supply, and a main relay applying or shutting off the power supply to the functional electrical devices in accordance with the state of the key switch, which includes a manipulation sensing means; a control relay installed between the key switch and the main relay to apply a key switch signal to a driving unit of the main relay if the electricity is not applied to its driving unit and to shut off the key switch signal to the driving unit of the main relay if the electricity is applied to its driving unit; and a controller receiving a manipulation signal from the manipulation sensing means and shutting off the power supply by driving the control relay if there is no manipulation signal for a predetermined time.

Preferably, the controller may include a shutoff means communicably connected to an engine controller to stop the engine if there is no manipulation signal and to shut off the power supply by driving the control relay after the predetermined time elapses.

The manipulation sensing means may be any one of a manipulation lever, an acceleration pedal, and a manipulation locking lever. Also, the manipulation sensing means may include a means for determining that there is no manipulation if a fuel control amount of the engine, an engine load, or an engine speed is kept a predetermined value for the predetermined time.

The apparatus for shutting off a power supply for a vehicle according to an embodiment of the present invention further includes an alarm means for giving an alarm when the control relay is shifted to an on-state contact and is turned on.

In another aspect of the present invention, there is provided an apparatus for shutting off a power supply for construction equipment or a vehicle driven by an engine, including a power supply, functional electrical devices connected to the power supply, a key switch managing the power supply, and a main relay applying or shutting off the power supply to the functional electrical devices in accordance with the state of the key switch, which includes a manipulation sensing means; a control relay installed between the key switch and the main relay to apply a key switch signal to a driving unit of the main relay if the electricity is not applied to its driving unit and to shut off the key switch signal to the driving unit of the main relay as well as to maintain the present state by connecting the key switch signal to its driving unit if the electricity is applied to its driving unit; and a controller receiving the power being applied from an output unit of the main relay, and having an output unit receiving a manipulation signal from the manipulation sensing means and driving the control relay after the predetermined time if it is sensed that there is no manipulation signal.

The controller may include a condensing means for maintaining the power supply for the predetermined time to drive the control relay so as to make it possible to shift the contact of the relay.

The controller may have an output unit that is connected to the driving unit of the main relay in parallel to the output unit of the control relay, and include a shutoff means for shutting off a control output after maintaining the control output for the predetermined time so as to make it possible to shift the contact of the control relay.

The controller may have an output unit that has a main relay output unit separately from the control relay output unit, and include a control means for maintaining the control relay output unit in a turned-on state before the control relay is driven and turning off the output of the main relay out unit at a time point where the control relay is driven or after the time point.

The controller may include a second shutoff means communicably connected to an engine controller to stop the engine if there is no manipulation signal and to shut off the power supply by driving the control relay after the predetermined time elapses.

The manipulation sensing means may be any one of a manipulation lever, an acceleration pedal, and a manipulation locking lever. Also, the manipulation sensing means may include a means for determining that there is no manipulation if a fuel control amount of the engine, an engine load, or an engine speed is kept a predetermined value for the predetermined time.

The apparatus for shutting off a power supply for a vehicle according to an embodiment of the present invention further includes an alarm means for giving an alarm when the control relay is shifted to an on-state contact and is turned on.

In still another aspect of the present invention, there is provided an apparatus for shutting off a power supply for a vehicle, including a power supply, functional electrical devices connected to the power supply, a key switch managing the power supply, and a main relay applying or shutting off the power supply to the functional electrical devices in accordance with the state of the key switch, which includes a control relay installed between the key switch and the main relay to apply a key switch signal to a driving unit of the main relay if the electricity is not applied to its driving unit and to shut off the key switch signal to the driving unit of the main relay if the electricity is applied to its driving unit; and a controller driving the control relay.

In still another aspect of the present invention, there is provided an apparatus for shutting off a power supply for a vehicle, including a power supply, functional electrical devices connected to the power supply, a key switch managing the power supply, and a main relay applying or shutting off the power supply to the functional electrical devices in accordance with the state of the key switch, which includes a control relay installed between the key switch and the main relay to apply a key switch signal to a driving unit of the main relay if the electricity is not applied to its driving unit, and to shut off the key switch signal to the driving unit of the main relay and to maintain the present state by connecting the key switch signal to its driving unit if the electricity is applied to its driving unit; and a controller receiving the power being applied from an output unit of the main relay and driving the control relay.

The driving unit of the main relay may be connected in parallel to the driving unit of the control relay.

The driving unit of the main relay may be separately driven by the controller.

The controller may include a shutoff means which drives the driving unit of the main relay in advance of the driving of the control relay, and shuts off the power supply by cutting off the driving of the main relay.

With the above-described construction according to embodiments of the present invention, if the equipment is not used for a predetermined time, the engine is stopped even under the condition that the engine is being driven, and even if the key switch is in a turned-on state, the power that is supplied to the functional electrical devices can be stably shut off by the controller.

Also, in the power management system that is controlled by the key switch, the power that is supplied to the functional electrical devices can be stably shut off by the controller even if the key switch is in a turned-on state, and the power consumption can be reduced through the use of the minimum power even in the turned-on state of the key switch.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 1:
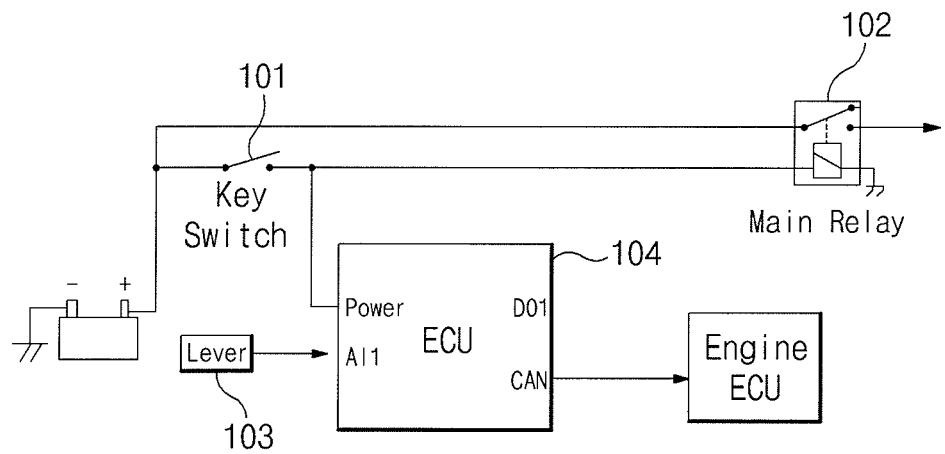
FIG. 1 is a diagram illustrating the configuration of a first example of an apparatus for shutting off a power supply for a vehicle in the related art.
Figure 2:
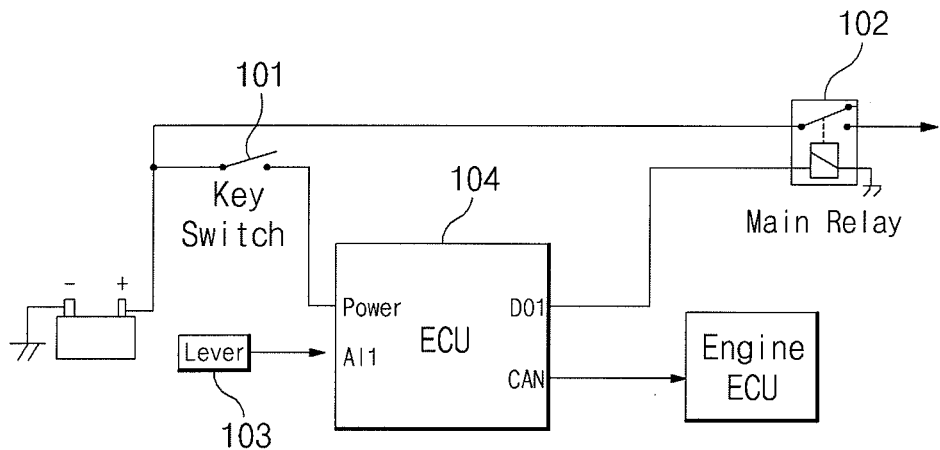
FIG. 2 is a diagram illustrating the configuration of a second example of an apparatus for shutting off a power supply for a vehicle in the related art.
Figure 3:
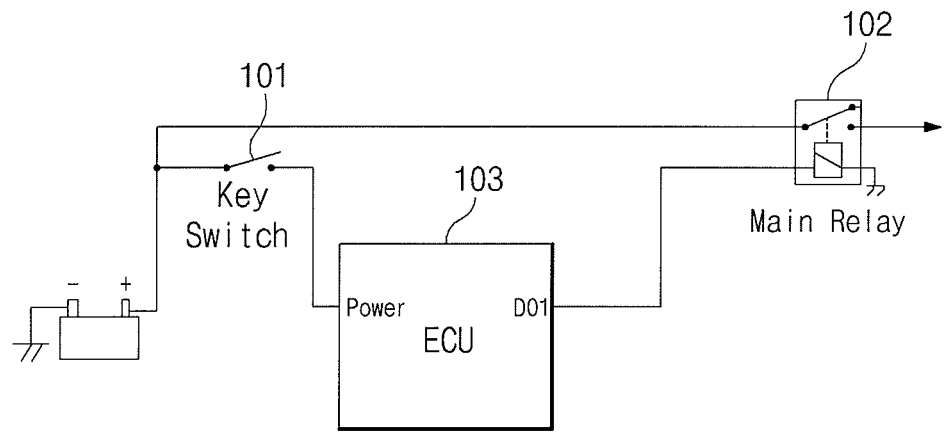
FIG. 3 is a diagram illustrating the configuration of a third example of an apparatus for shutting off a power supply for a vehicle in the related art.
Figure 4:
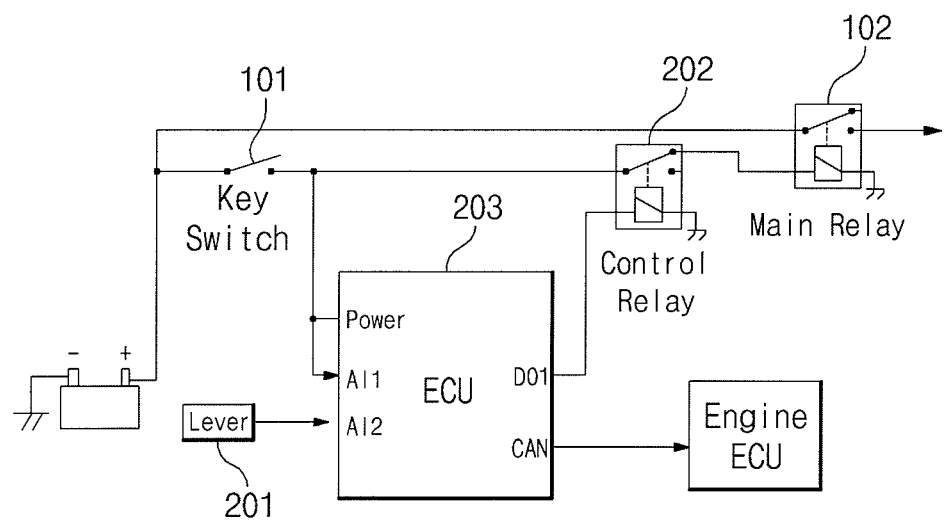
FIG. 4 is a diagram illustrating the configuration of an apparatus for shutting off a power supply for a vehicle according to a first embodiment of the present invention.

FIG. 4 is a diagram illustrating the configuration of an apparatus for shutting off a power supply for a vehicle according to a first embodiment of the present invention.

In construction equipment or a vehicle driven by an engine, an apparatus for shutting off a power supply according to the first embodiment of the present invention, which is provided with a power supply, functional electrical devices (not illustrated) connected to the power supply, a key switch 101 managing the power supply, and a main relay 102 applying or shutting off the power supply to the functional electrical devices in accordance with the state of the key switch 101, includes a control lever 201, a control relay 202, and a controller (ECU) 203.

That is, the apparatus for shutting off a power supply according to the first embodiment of the present invention further includes the control lever 201, the control relay 202 installed between the key switch 101 and the main relay 102 to apply a key switch signal to a driving unit of the main relay 102 if the electricity is not applied to its driving unit and to shut off the key switch signal to the driving unit of the main relay 102 if the electricity is applied to its driving unit; and the controller (ECU) 203 receiving a manipulation signal from the control lever 201 and shutting off the power supply by driving the control relay 202 if there is no manipulation signal for a predetermined time.

The control lever 201, which is connected to the controller (ECU) 203 which shuts off the power supply by driving the control relay 202 if there is no manipulation signal for a predetermined time, applies the manipulation signal to the controller (ECU) 203, and may be an acceleration pedal or a manipulation locking lever.

The control relay 202 is installed between the key switch 101 and the main relay 102. If the electricity is not applied to the driving unit, the control relay 202 applies the key switch signal to the driving unit of the main relay 102, while if the electricity is applied to the driving unit of the main relay 202, the control relay 202 intercepts the key switch signal applied to the driving unit of the main relay 102.

The controller (ECU) 203 is connected to the control lever 201, the key switch 101, and the control relay 202. The controller (ECU) 203 receives the manipulation signal from the manipulation lever 201, and if the manipulation signal is not received for the predetermined time, the controller (ECU) 203 shuts off the power supply by driving the control relay 202.

Hereinafter, the operation of the apparatus for shutting off a power supply for a vehicle according to the first embodiment of the present invention will be described.

First, in the case where the engine is operated, the controller (ECU) 203 senses whether the control lever 201 is manipulated, and if the control lever 201 is not manipulated for a predetermined time, the controller (ECU) sends an engine stop signal to the engine ECU through CAN communication.

Then, the engine ECU receives the engine stop signal and stops the engine.

Then, if the controller (ECU) 203 operates the control relay 202, the driving signal to the main relay 102 is intercepted even in a state where the key switch 101 is turned on, and thus the main relay 102 is intercepted to shut off the power supply.

At this time, since it is required that the control relay 202 continues to be driven, the controller (ECU) 203 should operate continuously.

On the other hand, if the control relay 202 is not driven, the key switch signal directly drives the main relay 102, and thus if a problem occurs in the controller (ECU), there is higher possibility that the power supply is maintained in comparison to that in the related art.

For example, when a problem occurs in the power of the controller (ECU) 203, the main relay 102 is controlled directly by the key switch 101, and thus the functional electrical devices can operate normally.

In the related art, the driving of the main relay 102 becomes impossible on the same condition, and thus the functional electrical devices cannot be used.

Figure 5:
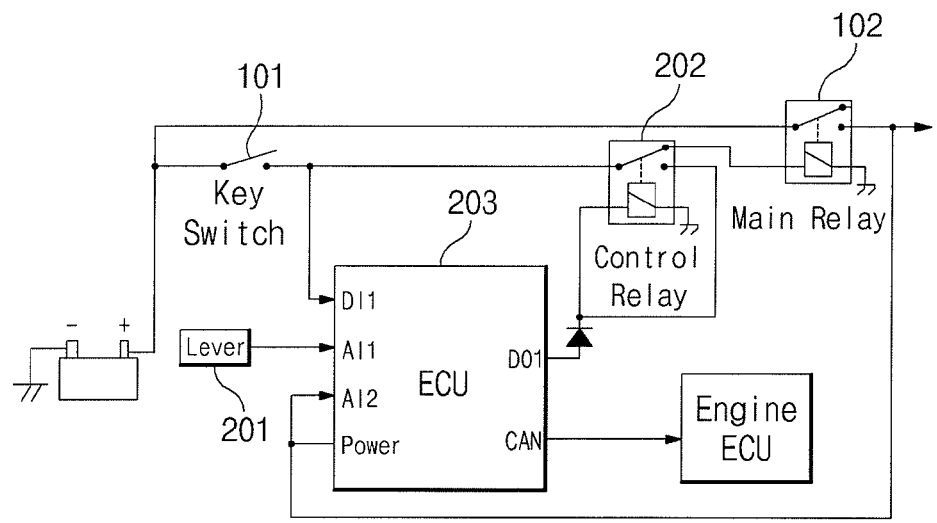
FIG. 5 is a diagram illustrating the configuration of an apparatus for shutting off a power supply for a vehicle according to a second embodiment of the present invention.

FIG. 5 is a diagram illustrating the configuration of an apparatus for shutting off a power supply for a vehicle according to a second embodiment of the present invention. According to the second embodiment of the present invention, in addition to the apparatus for shutting off a power supply for a vehicle according to the first embodiment of the present invention as illustrated in FIG. 4, the power of the controller (ECU) 203 itself is connected to and controlled by the output of the main relay 102.

That is, in the apparatus for shutting off a power supply for a vehicle according to the first embodiment of the present invention, in order to shut of the power supply to the functional electrical devices while the key switch 101 is in a turned-on state, it is required to continuously supply the power to the controller (ECU) 203, and thus the power consumption is unavoidable.

In order to solve this problem, according the apparatus for shutting off a power supply for a vehicle according to the second embodiment of the present invention, the power of the controller (ECU) 203 is connected to and controlled by the output of the main relay 102. If the main relay is intercepted, the power of the controller (ECU) 203 is also intercepted.

While the engine is operated in a state where the key switch 101 is turned on, the controller (ECU) 203 senses whether the control lever 201 is manipulated, and if the control lever 201 is not manipulated for a predetermined time, the controller (ECU) 203 sends an engine stop signal to the engine ECU through CAN communication.

Then, the engine ECU receives the engine stop signal and stops the engine.

After the predetermined time, the controller (ECU) 203 drives the control relay 202, and due to this, the driving of the main relay 102 by the key switch 101 is intercepted to shut off the power supply through the main relay 102.

At the same time, the key switch signal is connected to the driving unit of the control relay 202, and even if the power of the controller (ECU) 203 is turned off and the output thereof is intercepted, the relay maintains its turned-on state to continuously maintain the power shutoff state of the main relay 102.

Accordingly, only the control relay 202 continues the driving operation by a battery, and thus the power consumption is relatively reduced.

In general, a predetermined time is required in shifting the relay contact. That is, since the contact of the main relay 102 is disconnected at the operation start time point of the control relay 202, there is a possibility that the power of the controller (ECU) 203 is shut off before the contact shift of the control relay 202 is completed. To cope with this, the power supply of the controller (ECU) 203 is provided with a capacitor, which continues the power supply operation as far as the completion of the contact shift.

Figure 6:
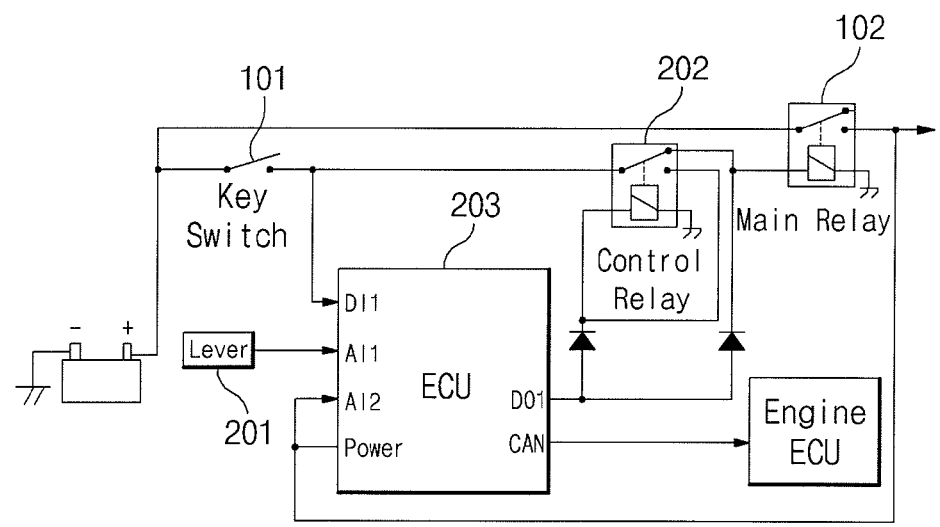
FIG. 6 is a diagram illustrating the configuration of an apparatus for shutting off a power supply for a vehicle according to a third embodiment of the present invention.

FIG. 6 is a diagram illustrating the configuration of an apparatus for shutting off a power supply for a vehicle according to a third embodiment of the present invention. According to the third embodiment of the present invention, the driving unit of the main relay 102 is driven by the controller (ECU) 203 in parallel to the key switch signal, and thus the stability of the power of the controller (ECU) 203 is secured.

That is, the apparatus for shutting off a power supply for a vehicle according to the third embodiment of the present invention makes up for the unstable power of the controller (ECU) 203 when the contact is shifted in the above-described embodiment, and the driving unit of the main relay 102 is connected to and is driven by the controller (ECU) 203 in parallel to the key switch signal, thereby securing the stability of the power of the controller (ECU) 203.

If the controller (ECU) 203 drives the driving unit of the control relay 202 when the controller (ECU) 203 intends to optionally shut off the power supply, the main relay 102 continues the driving operation, and the key switch signal from the side of the control relay 202 is intercepted.

At this time, the driving unit of the control relay 202 is connected to the key switch signal, and thus it continuously maintains its state regardless of the output of the controller (ECU) 203.

If the controller (ECU) 203 intercepts the driving signal of the control relay 202 after a predetermined time, the main relay 102 is also intercepted to shut off the power supply.

Figure 7:
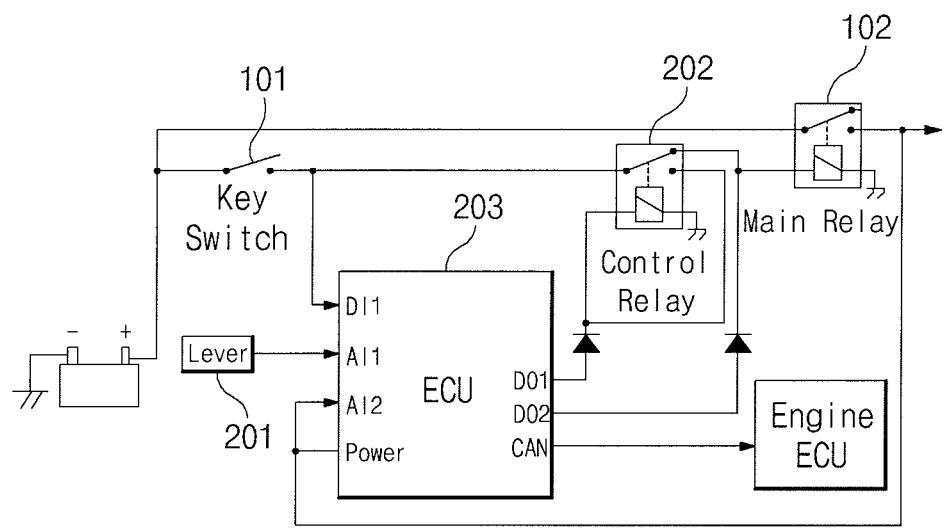
FIG. 7 is a diagram illustrating the configuration of an apparatus for shutting off a power supply for a vehicle according to a fourth embodiment of the present invention.

FIG. 7 is a diagram illustrating the configuration of an apparatus for shutting off a power supply for a vehicle according to a fourth embodiment of the present invention. According to the fourth embodiment of the present invention, the driving unit of the controller (ECU) 203 is separated into the driving unit of the main relay 102 and the driving unit of the control relay 202.

That is, in the apparatus for shutting off a power supply for a vehicle according to the fourth embodiment of the present invention, the driving unit of the controller (ECU) 203 is separated into the driving unit of the main relay 102 and the driving unit of the control relay 202, and the power of the controller (ECU) 203 is maintained by driving the control relay 202 in a state where the main relay 102 is first driven. Thereafter, if the control relay 202 and the main relay 102 are stopped, the driving of the main relay 102 is intercepted to shut off the power supply.

If the engine is stopped and the power supply is shut off after an operator gets out of the equipment, the operator is unable to know whether the key switch 101 of the equipment is turned on. In this case, the power supply may be maintained for a predetermined time, and if the voltage AI2 of the power is lowered below a predetermined value, the main relay 102 may be intercepted.

Figure 8:
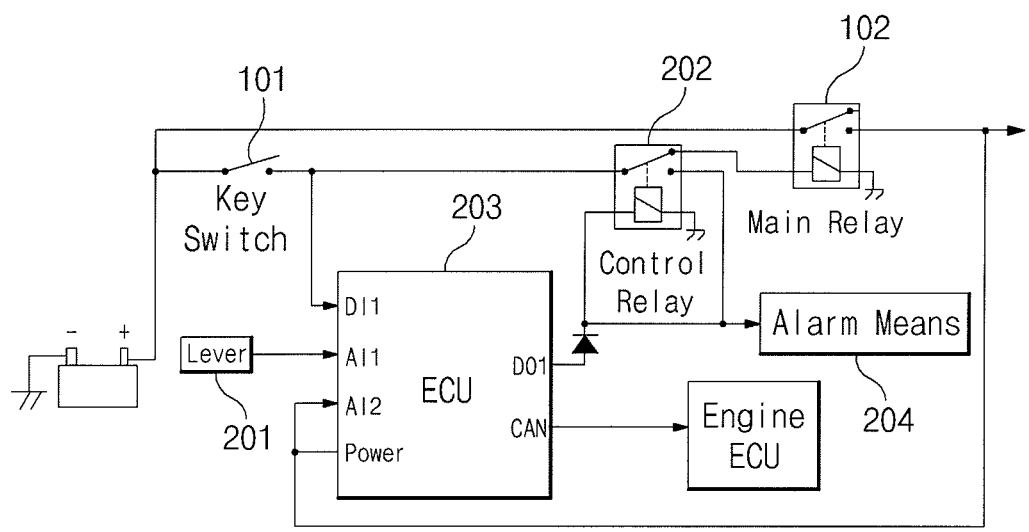
FIG. 8 is a diagram illustrating the configuration of an apparatus for shutting off a power supply for a vehicle according to a fifth embodiment of the present invention.

FIG. 8 is a diagram illustrating the configuration of an apparatus for shutting off a power supply for a vehicle according to a fifth embodiment of the present invention. According to the fifth embodiment of the present invention, when the power supply to the equipment is shut off, it is not known whether such power shutoff is normally caused by the key switch 101, and thus a separate alarm means 204 is connected to the contact of the turned-on state of the control relay 202 to inform the operator that the automatic power shutoff function is under operation.

In the first to fifth embodiments of the present invention as described above, whether the working device is manipulated, which is the judgement condition of the engine stop and the power shutoff of the controller (ECU) 203, is not limited to the manipulation of the control lever. That is, if a manipulation locking lever is in a manipulation locking state for a predetermined time in the construction equipment, or if the operation of an acceleration pedal is stopped for the predetermined time in a vehicle provided with wheels, it is natural to judge the same condition, to stop the engine, and to shut off the power supply.

Also, if the amount of fuel that is transferred from the engine controller (engine ECU) proposed in the embodiments of the present invention, an engine load, or an engine speed is maintained for a predetermined time, it is natural to judge that there is no manipulation, to stop the engine and to shut off the power supply. It is also natural to automatically shut off the power supply after the predetermined time even in a state where only the key switch 101 is turned on without driving the engine.

Figure 9:
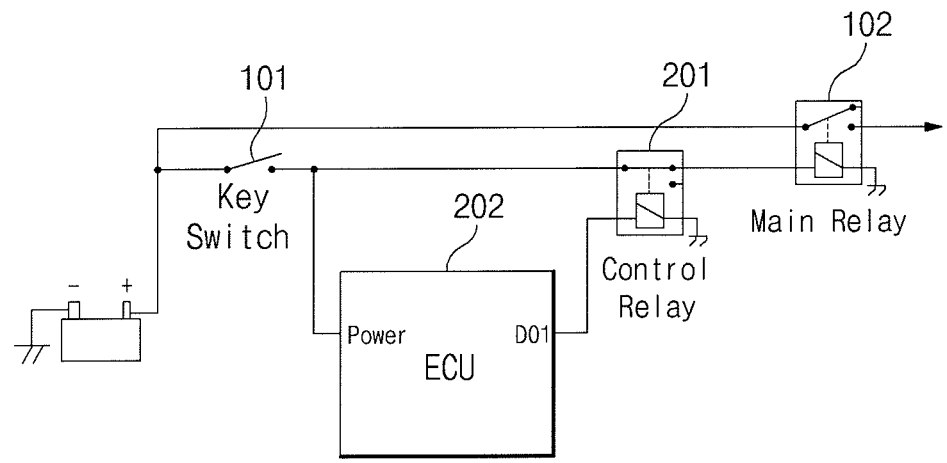
FIG. 9 is a diagram illustrating the configuration of an apparatus for shutting off a power supply for a vehicle according to a sixth embodiment of the present invention.

FIG. 9 is a diagram illustrating the configuration of an apparatus for shutting off a power supply for a vehicle according to a sixth embodiment of the present invention. According to the sixth embodiment of the present invention, the key switch 101 directly drives the main relay 102, and a control relay 201 is additionally provided between the key switch 101 and the main relay 102, so that if the controller (ECU) 202 drives the control relay 201, the main relay 102 is intercepted to shut off the power supply.

Specifically, in the apparatus for shutting off a power supply for a vehicle provided with the functional electrical devices (not illustrated), the key switch 101 managing the power supply, and the main relay 102 for applying or intercepting the power to the functional electrical devices according to the state of the key switch 101, the key switch 101 is connected to directly drives the main relay, and the controller (ECU) 202 drives the control relay 201 that is installed between the key switch 101 and the main relay 102.

That is, the control relay 201, which is installed between the key switch 101 and the main relay 102, applies the key switch signal to the driving unit of the main relay 102 if the electricity is not applied to the driving unit, while the control relay 201 intercepts the key switch signal to the driving unit of the main relay 102 if the electricity is applied to the driving unit.

The control relay 201 is installed between the key switch 101 and the main relay 102, and applies the key switch signal to the driving unit of the main relay 102 if the electricity is not applied to the driving unit, while it intercepts the key switch signal to the driving unit of the main relay 102 if the electricity is applied to the driving unit.

The controller (ECU) 202, which is connected to the key switch 101 and the control relay 201, drives the control relay 201 additionally provided between the key switch 101 and the main relay 102, and thus the main relay 102 is intercepted to shut off the power supply.

The operation of the apparatus for shutting off the power supply for the vehicle according to the sixth embodiment of the present invention will be described as follows.

First, if the controller (ECU) 202 operates the control relay 201, the driving signal to the main relay 201 is intercepted even in a state where the key switch 101 is turned on, and thus the main relay 102 is intercepted to shut off the power supply.

At this time, since it is required that the control relay 201 continues to be driven, the controller (ECU) 202 should operate continuously.

On the other hand, if the control relay 201 is not driven, the key switch signal directly drives the main relay 102, and thus if a problem occurs in the controller (ECU) 202, there is higher possibility that the power supply is maintained in comparison to that in the related art.

For example, when a problem occurs in the power of the controller (ECU) 202, the main relay 102 is controlled directly by the key switch 101, and thus the functional electrical devices can operate normally.

In the related art, the driving of the main relay 102 becomes impossible on the same condition, and thus the functional electrical devices cannot be used.

Figure 10:
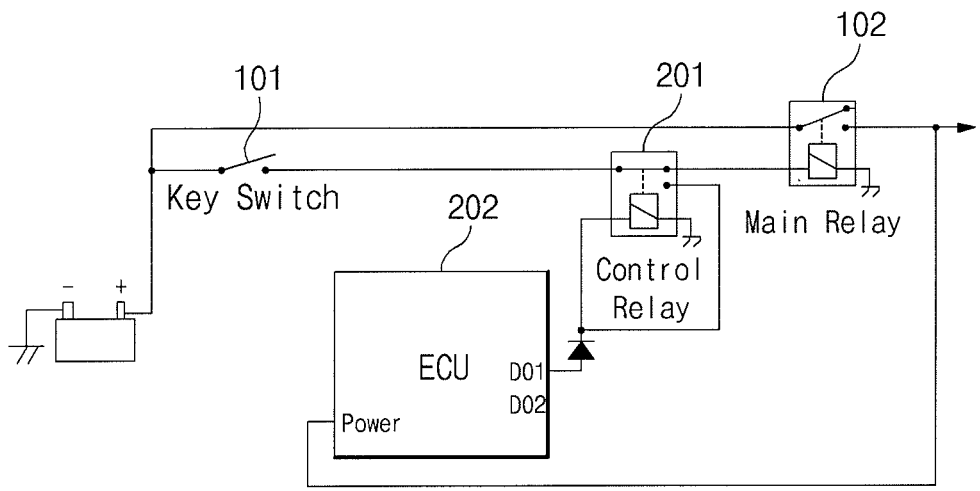
FIG. 10 is a diagram illustrating the configuration of an apparatus for shutting off a power supply for a vehicle according to a seventh embodiment of the present invention.

FIG. 10 is a diagram illustrating the configuration of an apparatus for shutting off a power supply for a vehicle according to a seventh embodiment of the present invention. According to the seventh embodiment of the present invention, in addition to the apparatus for shutting off a power supply for a vehicle according to the sixth embodiment of the present invention as illustrated in FIG. 9, the power of the controller (ECU) 202 itself is connected to and controlled by the output of the main relay 102.

That is, in the apparatus for shutting off a power supply for a vehicle according to the first embodiment of the present invention, in order to shut of the power supply to the functional electrical devices while the key switch 101 is in a turned-on state, it is required to continuously supply the power to the controller (ECU) 202, and thus the power consumption is unavoidable.

In order to solve this problem, according the apparatus for shutting off a power supply for a vehicle according to the seventh embodiment of the present invention, the power of the controller (ECU) 202 is connected to and controlled by the output of the main relay 102. If the main relay 102 is intercepted, the power of the controller (ECU) 202 is also intercepted.

If the controller (ECU) 202 judges to shut off the power supply in a state where the key switch 101 is turned on, it drives the control relay 201, and due to this, the driving power to the main relay 102 is intercepted.

Also, the key switch is connected to the driving unit of the control relay 201, and the control relay 201 continues the driving operation regardless of the controller (ECU) 202 to intercept the power supply to the driving unit of the main relay 102.

Accordingly, the power supply by the main relay 102 is shut off.

In general, a predetermined time is required in shifting the relay contact. That is, since the contact of the main relay 102 is disconnected at the operation start time point of the control relay 201, there is a possibility that the power of the controller (ECU) 202 is shut off before the contact shift of the control relay 201 is completed. However, since the power supply of the controller (ECU) 202 is generally provided with a capacitor, the power supply operation continues as far as the completion of the contact shift to cause no problem.

Figure 11:
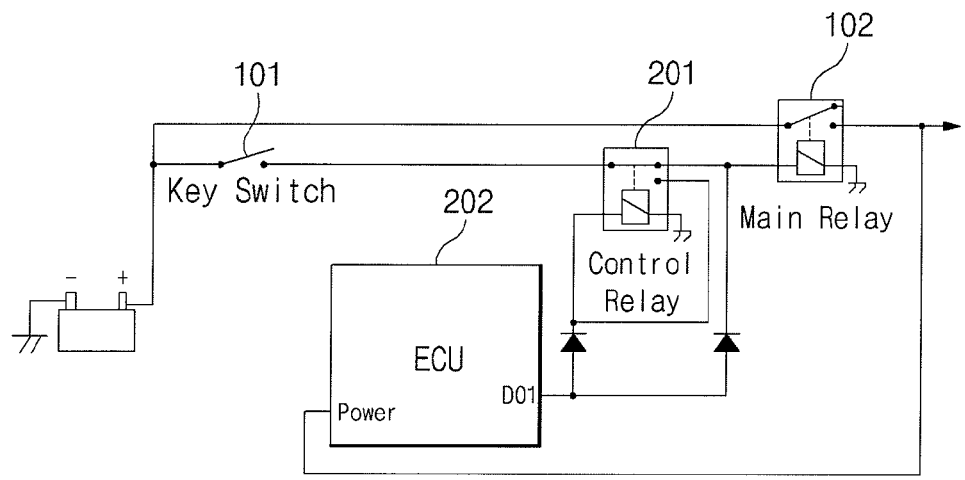
FIG. 11 is a diagram illustrating the configuration of an apparatus for shutting off a power supply for a vehicle according to an eighth embodiment of the present invention.

FIG. 11 is a diagram illustrating the configuration of an apparatus for shutting off a power supply for a vehicle according to an eighth embodiment of the present invention. According to the eighth embodiment of the present invention, the driving unit of the main relay 102 is driven by the controller (ECU) 202 in parallel to the key switch signal, and thus the stability of the power of the controller (ECU) 202 is secured.

That is, the apparatus for shutting off a power supply for a vehicle according to the eighth embodiment of the present invention makes up for the unstable power of the controller (ECU) 202 when the contact is shifted in the seventh embodiment, and the driving unit of the main relay 102 is connected to and is driven by the controller (ECU) 202 in parallel to the key switch signal, thereby securing the stability of the power of the controller (ECU) 202.

If the controller (ECU) 202 drives the driving unit of the control relay 201 when the controller (ECU) 202 intends to optionally shut off the power supply, the main relay 102 continues the driving operation, and the key switch signal from the side of the control relay 201 is intercepted.

At this time, the driving unit of the control relay 201 is connected to the key switch signal, and thus it continuously maintains its state regardless of the output of the controller (ECU) 202.

If the controller (ECU) 202 intercepts the driving signal of the control relay 201 after a predetermined time, the main relay 102 is also intercepted to shut off the power supply.

Accordingly, only the control relay 201 continues the driving operation through the battery, and thus the power consumption is relatively reduced.

Figure 12:
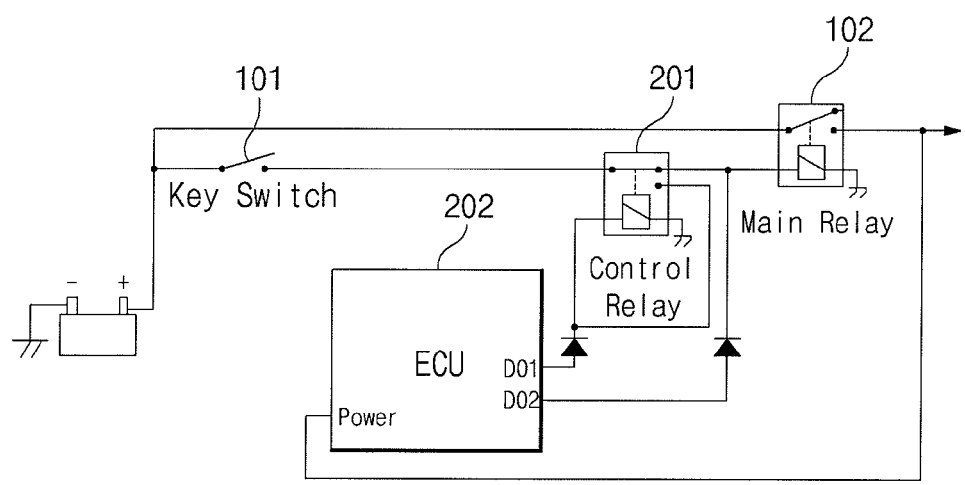
FIG. 12 is a diagram illustrating the configuration of an apparatus for shutting off a power supply for a vehicle according to a ninth embodiment of the present invention.

FIG. 12 is a diagram illustrating the configuration of an apparatus for shutting off a power supply for a vehicle according to a ninth embodiment of the present invention. According to the ninth embodiment of the present invention, the driving unit of the controller (ECU) 202 is separated into the driving unit of the main relay 102 and the driving unit of the control relay 201.

That is, in the apparatus for shutting off a power supply for a vehicle according to the ninth embodiment of the present invention, the driving unit of the controller (ECU) 202 is separated into the driving unit of the main relay 102 and the driving unit of the control relay 201 in addition to the eighth embodiment. If the control relay 201 is driven in a state where the main relay 102 is first driven, more stable driving becomes possible.

Specifically, in the apparatus for shutting off a power supply for a vehicle provided with the functional electrical devices (not illustrated), the key switch 101 managing the power supply, and the main relay 102 for applying or intercepting the power to the functional electrical devices according to the state of the key switch 101, the control relay 201, which is installed between the key switch 101 and the main relay 102, applies the key switch signal to the driving unit of the main relay 102 if the electricity is not applied to the driving unit, while the control relay 201 intercepts the key switch signal to the driving unit of the main relay 102 if the electricity is applied to the driving unit, and the controller (ECU) 202, which is driven by the power supply applied from the output unit of the main relay 102, drives the control relay 201.

Also, the driving unit of the main relay 102 is connected in parallel to the driving unit of the control relay 201 to be operated, and the driving unit of the controller (ECU) 202 is separated into the driving unit of the main relay 102 and the driving unit of the control relay 201.

As described above, the preferred embodiments of the present invention have been described in detail with reference to the accompanying drawings. The aspects and features of the present invention and methods for achieving the aspects and features will be apparent by referring to the embodiments as described above with reference to the accompanying drawings. However, the present invention is not limited to the embodiments as described above, but can be implemented in diverse forms. Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for shutting off a power supply for construction equipment or a vehicle driven by an engine, including a power supply, functional electrical devices connected to the power supply, a key switch managing the power supply, and a main relay applying or shutting off the power supply to the functional electrical devices in accordance with a state of the key switch, the apparatus comprising:
   manipulation sensing means;
   a control relay installed between the key switch and the main relay to apply a key switch signal to a driving unit of the main relay if the electricity is not applied to the driving unit and to shut off the key switch signal to the driving unit of the main relay if the electricity is applied to the driving unit; and
   a controller receiving a manipulation signal from the manipulation sensing means and shutting off the power by driving the control relay if there is no manipulation signal for a predetermined time;
   wherein the manipulation sensing means comprises means for determining that there is no manipulation if a fuel control amount of the engine, an engine load, or an engine speed is kept at a predetermined value for the predetermined time.

2. The apparatus according to claim 1, wherein the controller comprises a shutoff means communicably connected to an engine controller to stop the engine if there is no manipulation signal and to shut off the power supply by driving the control relay after the predetermined time elapses.

3. The apparatus according to claim 1, wherein the manipulation sensing means is any one of a manipulation lever, an acceleration pedal, and a manipulation locking lever.

4. The apparatus according to claim 1, further comprising alarm means for giving an alarm when the control relay is shifted to an on-state contact and is turned on.

5. An apparatus for shutting off a power supply for construction equipment or a vehicle driven by an engine, including a power supply, functional electrical devices connected to the power supply, a key switch managing the power supply, and a main relay applying or shutting off the power supply to the functional electrical devices in accordance with a state of the key switch, the apparatus comprising:
   manipulation sensing means;
   a control relay installed between the key switch and the main relay to apply a key switch signal to a driving unit of the main relay if the electricity is not applied to the driving unit and to shut off the key switch signal to the driving unit of the main relay as well as to maintain a present state by connecting the key switch signal to the driving unit if the electricity is applied to the driving unit; and
   a controller receiving the power being applied from an output unit of the main relay, and having an output unit receiving a manipulation signal from the manipulation sensing means and driving the control relay after a predetermined time if it is sensed that there is no manipulation signal;
   wherein the manipulation sensing means comprises means for determining that there is no manipulation if a fuel control amount of the engine, an engine load, or an engine speed is kept at a predetermined value for the predetermined time.

6. The apparatus according to claim 5, wherein the controller comprises condensing means for maintaining the power for the predetermined time to drive the control relay so as to make it possible to shift the contact of the relay.

7. The apparatus according to claim 5, wherein the controller is provided with an output unit that is connected to the driving unit of the main relay in parallel to the output unit of the control relay, and comprises shutoff means for shutting off a control output after maintaining the control output for the predetermined time so as to make it possible to shift the contact of the control relay.

8. The apparatus according to claim 5, wherein the controller is provided with an output unit that has a main relay output unit separately from the control relay output unit, and comprises control means for maintaining the control relay output unit in a turned-on state before the control relay is driven and turning off the output of the main relay out unit at a point in time where the control relay is driven or after said point in time.

9. The apparatus according to claim 5, wherein the controller comprises a second shutoff means communicably connected to an engine controller to stop the engine if there is no manipulation signal and to shut off the power supply by driving the control relay after the predetermined time elapses.

10. The apparatus according to claim 5, wherein the manipulation sensing means is any one of a manipulation lever, an acceleration pedal, and a manipulation locking lever.

11. The apparatus according to claim 5, further comprising alarm means for giving an alarm when the control relay is shifted to an on-state contact and is turned on.

* * * * *